(No Model.)
W. J. WILCOX.
MECHANICAL TOY.
No. 552,802. Patented Jan. 7, 1896.
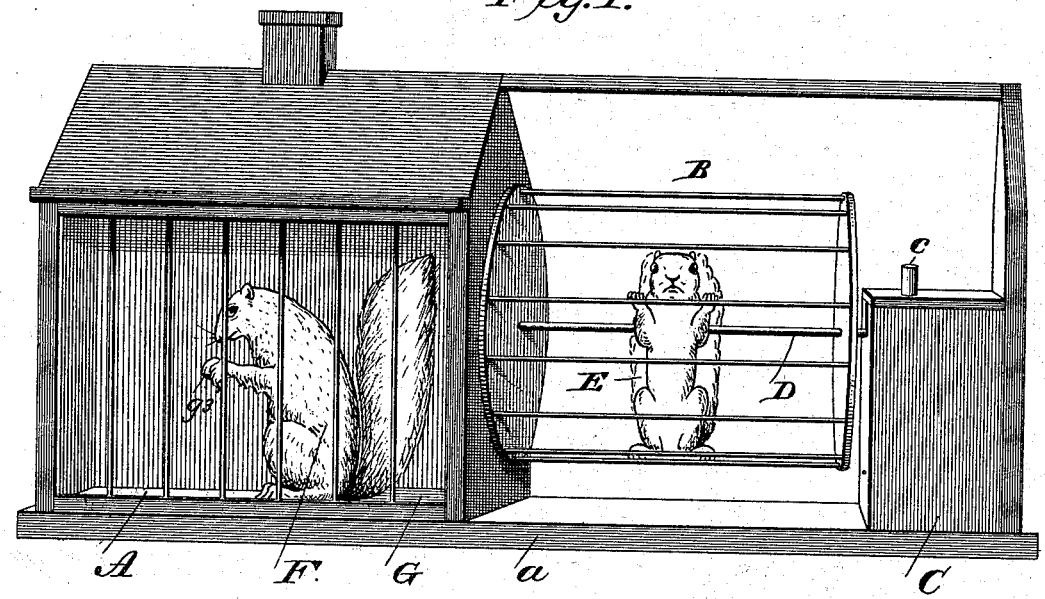
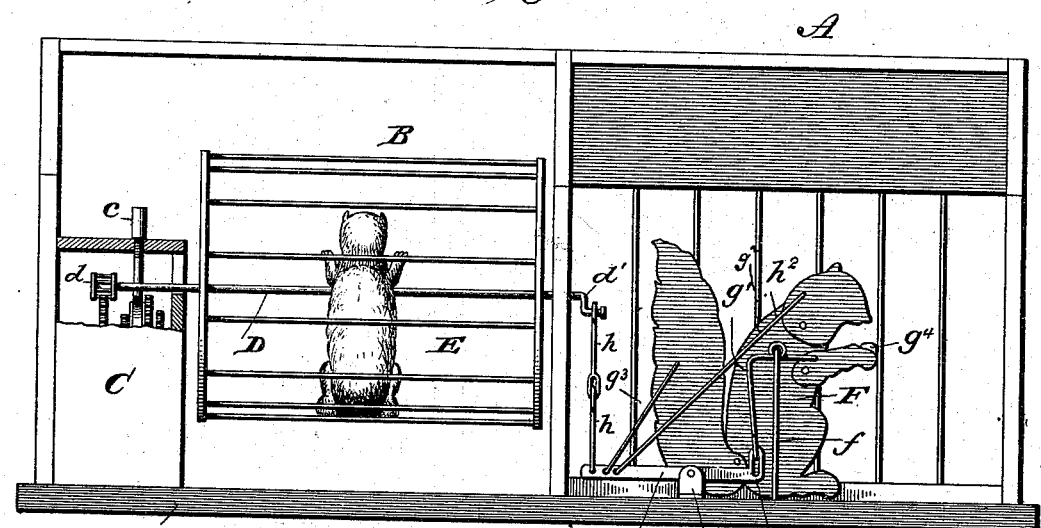
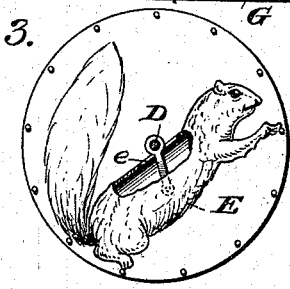
WITNESSES
G. S. Elliott
Whiting J. Wilcox
INVENTOR
by
Attorney

UNITED STATES PATENT OFFICE.

WHITING JEROME WILCOX, OF CORNWALL, CONNECTICUT.

MECHANICAL TOY.

SPECIFICATION forming part of Letters Patent No. 552,802, dated January 7, 1896.

Application filed September 21, 1895. Serial No. 563,226. (No model.)

*To all whom it may concern:*

Be it known that I, WHITING JEROME WILCOX, a citizen of the United States of America, residing at Cornwall, in the county of Litchfield and State of Connecticut, have invented certain new and useful Improvements in Mechanical Toys; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a mechanical toy intended to represent the figures of squirrels or other like animals in a cage, one of the figures being suspended in a tread-wheel and the other positioned in a house or cage, and both figures connected to a driven shaft, so that they will be operated upon to imitate the movements of the animals they represent, all as will be hereinafter fully set forth, and particularly pointed out in the claims.

In the accompanying drawings, forming part of this specification, Figure 1 is a perspective view illustrating the general appearance of a toy constructed in accordance with my invention. Fig. 2 is a side elevation, partly in section; and Fig. 3 is a sectional view through the tread-wheel, showing the manner of suspending the figure from the driven shaft.

The structure to which I have applied my invention resembles an ordinary squirrel-cage, having a house or cage A at one end and a tread-wheel B adjoining the same. The platform $a$ upon which the parts are mounted is provided at one end with a box C containing a suitable train of gearing driven by a spring in the usual manner, and the shaft of one of the gear-wheels is provided with a disk having a concave periphery with which engages a pin $c$, which passes through the top of the box and is provided at its lower end with a rubber block, which contacts with said disk. By means of the pin and disk the speed of the driving mechanism can be regulated or entirely stopped by depressing the pin.

D designates the driven shaft, which enters the box C and is provided with a pinion $d$ in mesh with one of the gear-wheels of the driving mechanism, the other end of said shaft passing through a side wall of the house or cage A, where it is bent to form a crank $d'$. The tread-wheel B is rigidly mounted upon the shaft between the house or cage A and the box C, and this tread-wheel is of the ordinary construction, having end pieces connected by cross-bars, as shown. Within the tread-wheel is mounted a figure E, representing a squirrel or other like animal, said figure being suspended from the shaft D by a short piece of wire $e$, having eyes formed at its ends, the upper eye encircling the shaft, while the figure is connected to the lower eye by a transverse pin. This arrangement permits the figure to oscillate within the tread-wheel so that when the tread-wheel is revolved the cross-bars will engage the paws of the figure and cause said figure to move slightly up and down in imitation of the jumping of a squirrel. The wire $e$ is connected to the figure so that the preponderance of weight of the latter will cause the figure to assume the position shown.

Upon the platform $a$ within the house or cage A is mounted a figure of a squirrel or other like animal, the body F of said figure being rigidly secured in position by a bar or upright $f$. The head, tail and fore legs of the figure are pivotally connected to the body, as shown in Fig. 2. Upon the platform $a$ adjacent to the figure F is attached a bearing $a'$, to which is pivoted a lever G, one end of said lever having a slotted portion $g$, with which engages a rod $g'$ for operating the fore legs of the figure F, while the other end of said lever is connected to the crank $d'$ of the shaft D by jointed connecting-rods $h$ and $h'$. The head and tail of the figure F are connected to the lever by rods $g^2$ and $g^3$, and it will be here noted that as the rod $g'$ is connected to one end of the lever and the rod $g^2$ to the other the head and fore legs of the figure F will be moved to and from each other as the lever is oscillated, thus giving the figure the appearance of eating or gnawing at a nut $g^4$, held between the fore paws. The rod $g'$ does not extend from the lever direct to the fore legs, but is pivoted at an intermediate portion to the upper end of the upright $f$.

In operation, when the driving mechanism contained in the box C has been wound and set in motion, the shaft D will be turned to revolve the tread-wheel B and actuate the movable parts of the figure F, and when the parts are in motion the figure E will appear to be revolving the tread-wheel, while the figure F will have the appearance of eating or gnawing at a nut.

The figures E and F may be stuffed animals or made up of stamped sheet metal or paper.

The device hereinbefore described is primarily adapted to be used as a mechanical toy, but can also be used for advertising purposes.

Having thus described my invention, what I claim as new, and desire to secure by Letters Patent, is—

1. In a mechanical toy, the combination with a tread-wheel rigidly connected to a driven shaft, of a figure suspended from the shaft within the tread-wheel so that its legs will be in the path of the cross-bars of the wheel, substantially as shown and for the purpose set forth.

2. In a mechanical toy, the combination, of a tread-wheel mounted on a driven shaft, and a figure suspended from the shaft by a rod or wire which is pivoted to the shaft and figure, the lower part of the figure having a preponderance of weight, to automatically throw a part of the same in the path of the cross-bars of the tread-wheel, substantially as shown and for the purpose set forth.

3. In a mechanical toy, the combination, of a tread-wheel mounted on a driven shaft, the shaft having a crank $d$ at one end; a figure suspended from the shaft within the tread-wheel so that its paws will engage the cross-bars thereof; and a figure having movable head, legs and tail which are connected to the crank end of the shaft, substantially as shown and for the purpose set forth.

4. In a mechanical toy, the combination, of a figure F consisting of a body to which are pivoted the head, tail and fore-legs; a lever pivoted adjacent to the figure and connected to the movable parts by rods, the rod from the head being connected to one end of the lever while the rod from the fore-legs is connected to the other end; together with mechanism for oscillating the lever, substantially as shown and for the purpose set forth.

5. In a mechanical toy, the combination of a tread-wheel mounted on a driven shaft, the shaft having a crank $d'$ at one end; a figure suspended from the shaft within the tread-wheel so that its paws will engage the cross-bars thereof; a centrally pivoted lever connected to the crank end of the shaft, and a figure having movable head, legs and tail which are connected by rods to opposite ends of the lever, substantially as shown and for the purpose set forth.

In testimony whereof I affix my signature in presence of two witnesses.

WHITING JEROME WILCOX.

Witnesses:
E. S. WILLETT,
W. A. SEMPLE.